(12) United States Patent
Ohkura et al.

(10) Patent No.: US 8,017,209 B2
(45) Date of Patent: Sep. 13, 2011

(54) OPTICAL RECORDING MEDIUM

(75) Inventors: Hiroko Ohkura, Sagamihara (JP); Eiko Hibino, Yokohama (JP); Hiroshi Deguchi, Yokohama (JP); Kazunori Ito, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 493 days.

(21) Appl. No.: 12/161,740

(22) PCT Filed: Jan. 18, 2007

(86) PCT No.: PCT/JP2007/051121
§ 371 (c)(1),
(2), (4) Date: Jul. 22, 2008

(87) PCT Pub. No.: WO2007/083837
PCT Pub. Date: Jul. 26, 2007

(65) Prior Publication Data
US 2010/0221480 A1  Sep. 2, 2010

(30) Foreign Application Priority Data

Jan. 23, 2006 (JP) .................................. 2006-014337
Jan. 18, 2007 (JP) .................................. 2007-009196

(51) Int. Cl.
*B32B 3/03* (2006.01)
(52) U.S. Cl. .................... 428/64.1; 428/64.4; 430/270.1
(58) Field of Classification Search ................. 428/64.1, 428/64.4
See application file for complete search history.

(56) References Cited

U.S. PATENT DOCUMENTS 7,485,356 B2 *  2/2009  Shingai et al. ............... 428/64.4
2001/0003641 A1  6/2001  Kunitomo et al.
2002/0110063 A1  8/2002  Yamada et al.
2005/0128929 A1  6/2005  Matsuura
2005/0175822 A1  8/2005  Ohno et al.
2005/0254410 A1  11/2005  Kibe et al.

FOREIGN PATENT DOCUMENTS

| | | |
|---|---|---|
| EP | 1107244 A2 | 6/2001 |
| EP | 1372148 A2 | 12/2003 |
| EP | 1598818 A1 | 11/2005 |
| JP | 9-138974 | 5/1997 |
| JP | 11-185294 | 7/1999 |
| JP | 11-185295 | 7/1999 |
| JP | 11-353707 | 12/1999 |

(Continued)

OTHER PUBLICATIONS

Jul. 29, 2009 European search report in connection with a counterpart European patent application No. 07 70 7368.

(Continued)

*Primary Examiner* — Elizabeth Mulvaney
(74) *Attorney, Agent, or Firm* — Cooper & Dunham LLP

(57) ABSTRACT

To provide an optical recording medium in which error-causing short marks are produced in numbers small enough excellent high-recording characteristics and in which amorphous marks are uniform in shape. The optical recording medium includes: a first protective layer; a recording layer containing Sb as a main ingredient; a second protective layer; and a reflective layer, the first protective layer, the recording layer, the second protective layer and the reflective layer being provided in the order in which light passes through the medium for recording and reproduction of information, wherein the first protective layer and/or the second protective layer, both of which are in contact with the recording layer, are/is formed of a crystalline oxide.

14 Claims, 3 Drawing Sheets

FOREIGN PATENT DOCUMENTS

| | | |
|---|---|---|
| JP | 2004-5767 | 1/2004 |
| JP | 2004-13926 | 1/2004 |
| JP | 2004-178779 | 6/2004 |
| JP | 2005-190642 | 7/2005 |
| JP | 2005-339683 | 12/2005 |
| JP | 2006-152443 | 6/2006 |
| TW | I228248 | 2/2005 |
| WO | WO2004/079037 A1 | 9/2004 |

OTHER PUBLICATIONS

Jun. 10, 2010 Taiwanese official action (including English translation) in connection with counterpart Taiwanese patent application.

\* cited by examiner

OPTICAL RECORDING MEDIUM

TECHNICAL FIELD

This disclosure relates to a rewritable optical recording medium with a phase change recording layer, such as Digital Versatile Disc ReWritable (DVD-RW), DVD+RW, DVD-RAM, BD-RE, and HD DVD-Rewritable.

BACKGROUND ART

In recent years extensive development has been in progress on optical recording media having a recording layer that is made of phase change material that enables repetitive recording. A number of phase change materials has been studied, including chalcogenide alloys such as Sn—Se—Te alloys, Sb—Te alloys, In—Se alloys, Ga—Te alloys, and Ge—Te alloys. In CD-RWs and 4×DVD+RWs, in particular, Ag—In—Sb—Te alloys are now in practical use that are obtained by addition of several different elements to Sb—Te alloys. Ag—In—Sb—Te alloys have several advantages that they readily undergo vitrification, produce uniform recording marks, are less likely to undergo composition change such as segregation and phase separation during multiple recording and erasing operations, and readily undergo initial crystallization.

As recording media have become widespread, there is an increasing expectation that further high-speed recording would be available. In 4×DVD+RWs, high-speed recording/erasing of up to 14 m/s has been made possible by the use of Ag—In—Sb—Te alloys in their recording layers. Phase change optical recording media utilize difference in light reflectivity between crystalline and amorphous phases in the recording layer. Because it is necessary for the phase change optical recording media to rapidly crystallize amorphous marks in order to achieve high-speed recording/erasing, there is a demand to develop phase change materials with high crystallization rates. For example, Ag—In—Sb—Te alloys with a higher Sb content for increased crystallization rates have been used as materials high-speed recording. Increased Sb contents, however, lead to reduction in the crystallization temperature in the recording layer and thus undesirably make the amorphous mark's shape non-uniform. For this reason, 4×DVD+RW (maximum recording speed=14 m/s) is the practical limit in this method of increasing the Sb content for increased crystallization rates.

Patent Literature 1 discloses an optical recording medium in which either the first protective layer or the second protective layer contains ZnO in an amount of 50 mol % or more. The technology disclosed in Patent Literature 1 aims to provide a high-density optical recording medium with excellent repetition durability by preventing cross-erasing and amplitude reduction upon repetitive recording. Patent Literature 1 discloses that the crystalline state of ZnOx, a main ingredient of the recording layer, is changed by addition with N, which aims to prevent mechanical deformation of the recording layer due to, for example, generation of stress in the layer by adjusting the hardness of the protective layer material. Patent Literature 1 discloses as recording layer materials chalcogenide alloy materials such as Pd—Ge—Sb—Te alloys, Nb—Ge—Sb—Te alloys, Pd—Nb—Ge—Sb—Te alloys, Ni—Ge—Sb—Te alloys, Ge—Sb—Te alloys, Co—Ge—Sb—Te alloys, In—Sb—Te alloys, Ag—In—Sb—Te alloys, and In—Se alloys. These materials are different from recording layer materials described in the present invention, which contain Sb as a main ingredient. Thus, the invention of Patent Literature 1 is distinct from the present invention in terms of the object and constitution.

Patent Literature 2 discloses an optical recording medium in which either the first protective layer or the second protective layer is formed of ZnO-BN, and aims to provide a phase change optical disc that features a small degree of amorphous mark deformation and exhibits excellent recording sensitivity and thermal stability. The recording layer of the optical disc uses a chalcogenide compound, and the recording layer material is different from that of the present invention that contains Sb as a main ingredient. Thus, the invention of Patent Literature 2 is distinct from the present invention in terms of the object and constitution.

Patent Literature 3 discloses an invention that aims to provide a high-density recording medium that, upon high-density recording, offers excellent signal quality (e.g., in terms of jitter) and excellent repetitive recording characteristics. Patent Literature 3 also discloses that, in an optical recording medium in which a first protective layer, a recording layer, a second protective layer and a reflective layer are arranged over a substrate, the electric resistance of the second layer is set to $3\times10^{-3}$ Ωcm or less as a means of improving productivity and increasing recording sensitivity. Patent Literature 3 discloses In—Sn—O, Zn—Al—O, Sn—O, etc., as the materials of the second protective layer, but fails to describe the crystallinity of the second protective layer. Because a chalcogenide compound is mainly used in the recording layer, the recording layer material is different from that of the present invention that contains Sb as a main ingredient. Thus, the invention of Patent Literature 3 is distinct from the present invention in terms of the object and constitution.

Patent Literature 4 discloses an invention that aims to provide a high-density recording medium that, upon high-density recording, offers excellent signal quality (e.g., in terms of jitter) and excellent repetitive recording characteristics. Patent Literature 4 also discloses that, in an optical recording medium in which a first protective layer, a recording layer, a second protective layer and a reflective layer are arranged over a substrate, the electric resistance of the first layer is set to $3\times10^{-3}$ Ωcm or less for the purpose of improving productivity and increasing recording sensitivity. Patent Literature 4 discloses In—Sn—O, Zn—Al—O, Sn—O, etc., as the materials of the first protective layer, but fails to describe the crystallinity of the these materials. Because a chalcogenide compound is mainly used in the recording layer, the recording layer material is different from that of the present invention that contains Sb as a main ingredient. Thus the invention of Patent Literature 4 is distinct from the present invention in terms of the object and constitution.

Patent Literatures 5 to 7 each discloses an optical recording medium using a $ZrO_2$ oxide as a crystallization facilitating layer. These Patent Literatures describe the effect of facilitating crystallization, but fail to describe the crystallinity of the $ZrO_2$ oxide. Because a chalcogenide compound is mainly used in the recording layer, the recording layer material is different from that of the present invention that contains Sb as a main ingredient. Thus, the inventions of Patent Literatures 5 to 7 are distinct from the present invention in terms of the object and constitution.

A phase change optical disc is generally obtained by depositing a thin film over a transparent plastic substrate provided with a particular groove. Plastic material used to manufacture this substrate is often polycarbonate, and injection molding is often used for the formation of the groove. The thin film deposited onto the substrate is a multilayered film, which is basically formed of a first protective layer, a recording layer, a second protective layer, and a reflective layer, which are stacked in the order in which light passes through the disc for recording or reproduction of information. Oxides, nitrides, sulfides, etc., are used for the first and second protective layers. Among these compounds, ZnS—$SiO_2$ obtained by combining ZnS with $SiO_2$ is often used. As the materials of the protective layer that is in contact with the recording layer, amorphous materials, such as ZnS—$SiO_2$, have been generally used, because the protective layer comes in contact with the recording layer to significantly affect the recording layer and hence the use of a crystalline protective layer makes amorphous marks prone to crystallization, causing a considerable reduction in the archivability.

Even Sb—Te alloys, particularly those with a high Sb content, exhibit low crystalline temperatures and hence resultant amorphous marks are prone to undergo crystallization. Accordingly, the use of crystalline materials for the manufacture of a protective layer significantly affects the recording layer that is in contact with the protective layer, leading to a problem that amorphous marks disappear by crystallization even in an environmental test at 70° C.

It was established in the course of development of high-speed recording optical recording media that while the optical recording medium, for which high-speed recording of over 8× for DVD is intended, offered excellent jitter values—a measure of the variations in mark shapes over time—many errors occurred. This phenomenon is one that has never been seen in conventional discs designed for low-speed recording. This phenomenon is more likely to occur upon low-speed recording on a optical recording medium that is capable of high-speed recording, and thus remains an important issue to be addressed. The present inventors investigated the cause of the frequent occurrence of this error and found that this is due to the fact that marks are sometimes generated that are extremely shorter in length than normal marks.

[Patent Literature 1] Japanese Patent Application Laid-Open (JP-A) No. 11-353707

[Patent Literature 2] Japanese Patent Application Laid-Open (JP-A) No. 09-138974

[Patent Literature 3] Japanese Patent Application Laid-Open (JP-A) No. 11-185294 [Patent Literature 4] Japanese Patent Application Laid-Open (JP-A) No. 11-185295

[Patent Literature 5] Japanese Patent Application Laid-Open (JP-A) No. 2004-178779

[Patent Literature 6] Japanese Patent Application Laid-Open (JP-A) No. 2004-013926

[Patent Literature 7] Japanese Patent Application Laid-Open (JP-A) No. 2004-005767

BRIEF SUMMARY

In an aspect of this disclosure, there is provided an optical recording medium in which marks of small length causing the foregoing error are produced in numbers small enough to achieve excellent high-recording characteristics. In another aspect of this disclosure there provided an optical recording medium in which amorphous marks are uniform in shape.

Various other aspects are discussed herein, such as, for example, the following:

(1) An optical recording medium including: a first protective layer; a recording layer containing Sb as a main ingredient; a second protective layer; and a reflective layer, the first protective layer, the recording layer, the second protective layer and the reflective layer being provided in the order in which light passes through the medium for recording and reproduction of information, wherein the first protective layer and/or the second protective layer, both of which are in contact with the recording layer, are/is formed of a crystalline oxide.

(2) The optical recording medium according to (1), wherein the protective layer that is in contact with the recording layer has an average crystal particle diameter of 2 nm to 30 nm.

(3) The optical recording medium according to (2), wherein the protective layer that is in contact with the recording layer has an average crystal particle diameter of 2 nm to 20 nm.

(4) The optical recording medium according to any one of (1) to (3), wherein the second protective layer is a crystalline transparent conductive film.

(5) The optical recording medium according to any one of (1) to (4), wherein the second protective layer contains zinc oxide as a main ingredient.

(6) The optical recording medium according to (5), wherein the second protective layer contains one or more elements selected from the group consisting of Al, Ga, In, Mn, Ge, Cu, and Si.

According to the aforementioned aspects, it is possible to provide an optical recording medium in which error-causing short marks are produced in numbers small enough for excellent high-recording characteristics, and an optical recording medium in which amorphous marks are uniform in shape.

In particular, according to the aforementioned aspects (4), it is possible to form uniform marks that have a large width and offer large degree of modulation.

In addition, according to the aforementioned aspects (5) and (6), it is possible to readily provide a protective layer with an average crystal particle diameter of 2 nm to 30 nm.

BEST MODE FOR CARRYING OUT THE INVENTION

The present invention will be described in detail below. As described above, 4×DVD+RW (maximum recording speed=14 m/s) is the practical limit for the prior art. The present inventors have diligently conducted studies and established that the further high-speed recording can be achieved by the use of a phase change material which contains Sb as a main ingredient and in which the content of a calcogen element (e.g., Te and Se) is set to 10 atomic % or less. As used herein, "main ingredient" means that Sb is contained in an amount of 60 atomic % or more, more preferably 70% or more. Materials that contain Sb as a main ingredient and contain a calcogen element (e.g., Te and Se) in an amount of 10 atomic % or less, such as SbGa, SbIn and SbSnGe, offer high crystallization rates, high crystallization temperatures and excellent archivability, and are capable of high-speed recording.

It was established in the course of development of high-speed recording materials that a phenomenon occurs that has never seen in conventional discs for low-speed recording, the phenomenon being the fact that jitter values are excellent but errors occur frequently.

Figure 1:
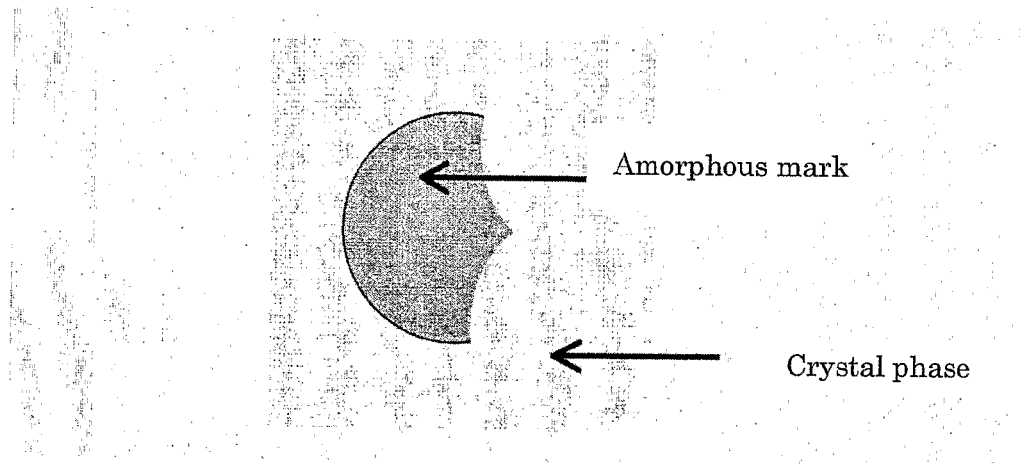
FIG. 1 shows an example of a normal 3T mark.
Figure 2:
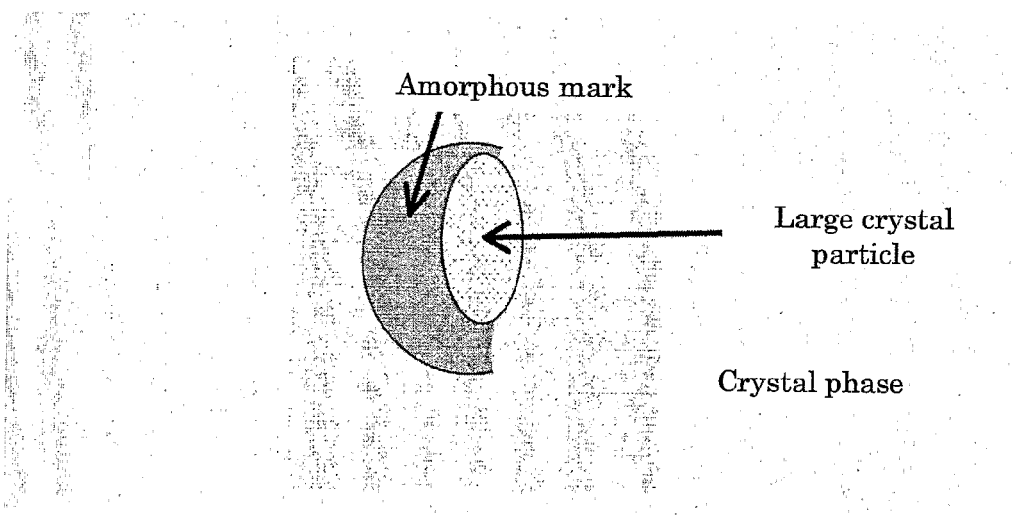
FIG. 2 shows an example of a 3T mark in which a crystal has been grown therein, which makes the mark shorter than normal counterparts.

The maximum rotation speed of a disc which can be achieved in the currently-available recording/reproducing apparatus for optical discs is 10,000 rpm. At this speed, the maximum linear velocity at a radius of 24 mm is about 25 m/s, which is equivalent to about 7×DVD recording speed when the standard linear velocity is set to 3.5 m/s. High-speed recording faster than 7×DVD requires the CAV recording method that keeps the disc rotation speed constant over a certain radius or entire surface of the disc. For this reason, low-speed recording is required at the inner region of the disc, and making recording possible over a wide linear velocity range is a challenge to be accomplished. The foregoing phenomenon occurs particularly where a disc that offers a high crystallization rate and thus is capable of high-speed recording is written at a low speed. This phenomenon is a significant problem that needs to be overcome at any cost upon development of discs that are capable of high-speed recording equivalent to 7×DVD or faster. To identify the cause of this error, the present inventors recorded marks on an optical recording medium and observed them using a transmission electron microscope. They found that almost all the marks were identical in shape with little variations in their size, and that high-speed recording was possible without any problems. After observation of many number of marks, however, they identified the presence of a large crystal grown in some of the amorphous marks, which made them extremely shorter than normal marks in length. The present inventors established that the cause of the foregoing error is due to these abnormal marks that are extremely short in length. FIG. 1 shows an example of a normal 3T mark, and FIG. 2 shows an example of a 3T mark in which a crystal has been grown in the mark, which makes the mark shorter than normal counterparts.

The present inventors conducted further studies and established that the use of Sb Ga, SbIn, SbSnGe or the like—materials which contain Sb as a main ingredient and in which the content of a calcogen element (e.g., Te and Se) is 10 atomic % or less—in the recording layer and the use of a crystalline oxide in the first protective layer and/or the second protective layer which are in contact with the recording layer results in the prevention of the generation of extremely short marks that cause the foregoing error. Moreover, it was also established that using a protective layer with an average crystal particle diameter of 2 nm to 30 nm can particularly prevent the generation of error-causing shorter marks and can provide uniform amorphous marks. It is preferable that the average crystal particle diameter be 2 nm to 20 nm. Upon considering the mechanism underlying this, the present inventors first focused on the mechanism by which such short such marks are produced.

When recording layers formed of materials that undergo crystallization by nucleation (e.g., $Ge_2Sb_2Te_5$) showed a certain temperature increase by irradiation with laser light and then cooled at the same rate, nucleation occurs in many amorphous marks and a number of crystals grow in a similar way. Accordingly, although a large crystal may be formed around the periphery of every mark, there is no chance for crystals to grow only in particular marks as long as there is something wrong with laser radiation.

Even in recording layers formed of materials that undergo crystallization by heterogeneous nucleation, nucleation is never seen in amorphous marks during the course of recording when the materials are ones that exhibit low crystallization rates. However, in the case of materials that exhibit high crystallization rates, when, through less frequent, nucleation occurs in amorphous marks during the course of recording, the resultant crystal nuclei may grow into large crystals due to high crystal growth rates. For this reason, although almost all the marks were normal in shape, a large crystal was sometimes seen in some of the amorphous marks.

The present invention, on the other hand, adopts in the recording layer materials that undergo crystallization by heterogeneous nucleation, that exhibit high crystallization rates, and that contain Sb as a main ingredient. Nevertheless, it is speculated that the use of a crystalline oxide in the protective layer that comes in contact with the recording layer can create an artificial situation where crystallization occurs by homogeneous nucleation as seen with $Ge_2Sb_2Te_5$ compounds. In particular, if the average crystal particle diameter in the protective layer is small, a number of crystal nuclei are uniformly formed at the interface between the recording layer and protective layer. For this reason, although a large crystal may be formed around the periphery of every mark, it may be unlikely that large crystals are grown only in particular amorphous marks. This may be reduced the occasional generation of shorter marks formed as a result of formation of a large crystal in the amorphous marks, many of which are normal in shape.

The possible reason underlying the formation of uniform amorphous marks is as follows: In addition to the fact that the recording layer materials that contain Sb as a main ingredient imparted more excellent archivability to the recording layer than conventional chalcogenide materials, the use of a protective layer with small crystal particle diameters succeeded in relatively weakening its crystallization facilitating effect because of randomly oriented crystals, while a protective layer with large crystal particle diameters exhibits a very high level of crystallization facilitating effect because atoms are regularly aligned in a crystal particle much as in a single crystal and thus amorphous marks are prone to crystallization. As described above, in the present invention, by using a crystalline oxide in the first protective layer and/or second protective layer which are in contact with the recording layer containing Sb as a main ingredient, it succeeded in obtaining an optical recording medium in which short marks causing the foregoing error are produced in numbers small enough for excellent high-recording characteristics.

Using a protective layer with an average crystal particle diameter of 2 nm to 30 nm for the first protective layer and/or second protective layer resulted in the manufacture of an optical recording medium with uniform amorphous marks. Preferably, the average crystal particle diameter is 2 nm to 20 nm. The first protective layer and/or second protective layer may be a multilayered structure consisting of two or more different layers; in this case, crystalline oxides may be used for the layer(s) that are in contact with the recording layer. In particular, it is preferable to use a crystalline transparent conductive film for the second protective layer that comes in contact with the recording layer. As used herein, the term "transparent conductive film" refers to a film that is transparent at optical wavelengths and highly electrically conductive, and in the present invention, refers specifically to a film with an average transmittance of 80% or more at optical wavelengths and with an electric resistance of $1 \times 10^{-1}$ Ωcm or less. The second protective layer interposed between the recording layer and reflective layer serves to temporarily prevent heat that has been generated as a result of light absorption from diffusing, to thereby increase the recording layer temperature to some extent and then release the heat toward the reflective layer. The faster the recording speed, the greater the influences on recording performance, even by small temperature variations; therefore, heat control by the second protective layer is particularly important.

Formation of amorphous marks in an high-speed recording disc that uses a phase change material of high crystallization rate requires more rapid cooling of the recording layer. The use of a crystalline transparent conductive film, however, can realize more rapid cooling, producing an optical recording medium which is capable of recording stable amorphous marks of large width enough to produce a high degree of modulation and in which error-causing shorter marks are produced in small numbers. Alternatively, a crystalline transparent conductive film may be used for the second protective layer, and a crystalline oxide for the first protective layer. In this case it is possible to further prevent the generation of short marks. The crystallinity of oxides can be determined for instance by X-ray diffraction or electron diffraction, or by observation with a transmission electron microscope.

Examples of crystalline oxides include ZnO, $ZrO_2$, $Al_2O_3$, $NbO_2$, $Nb_2O_5$, $SnO_2$, $In_2O_3$ and mixtures thereof; additional element(s) may be added to these species. When ZnO is to be used, it is contained as a main ingredient in an amount of 60% by mass or more, more preferably 70% by mass or more.

General materials of transparent conductive films are, for example, ZnO:Al, ZnO:Ga, ITO ($In_2O_3$+$SnO_2$), and IZO ($In_2O_3$+ZnO). In general, transparent conductive films used in liquid crystal displays are films with a very low electric resistance of the order of $10^{-4}$ Ωcm. In the case of the optical recording medium of the present invention, however, too low an electric resistance leads to too high a thermal conductivity and amorphous marks become difficult to form, resulting in lesser recording characteristics. Thus it is preferable to adopt transparent conductive films with an electric resistance in a range of $1 \times 10^{-4}$ Ωcm to $1 \times 10^{-2}$ Ωcm.

Whether these oxides undergo crystallization or not depends also on the film deposition conditions. For example, when an ITO film is to be deposited by sputtering, a crystalline film can be readily prepared by fully exhausting residual gas and by introducing $O_2$ in the sputtering gas. It is also possible to obtain a desired electric resistance value by adjusting the oxygen level in the gas. The use of a material, which is prepared by adding to a ZnO-based transparent conductive film one or more elements selected from Al, Ga, In, Mn, Ge, Cu, and Si in amounts of about 0.1% by mass to 15% by mass, results in an optical recording medium in which an average crystal particle diameter is 2 nm to 30 nm and in which uniform amorphous marks are produced. Mn and Ge, in particular, have a great effect of reducing the crystal particle diameter, and therefore, provision of optical recording media that produce uniform amorphous marks is facilitated. The second protective layer is preferably 5 nm to 50 nm in thickness, more preferably 5 nm to 25 nm in thickness. Upon manufacturing of these sputtering targets, additional elements may be mixed with ZnO in the form of oxide, such as $Al_2O_3$, $Ga_2O_3$, $In_2O_3$, and MnO.

For the reflective layer, Ag or a Ag alloy such as Ag—In, Ag—Pd, Ag—Pd—Cu or Ag—Cu is preferable, all of which offer high thermal conductivity. If the crystallization rate is too high, it becomes likely that re-crystallization occurs around the amorphous mark and thereby the mark is made thin and the degree of modulation tends to decrease. In order to minimize this re-crystallization area, it is preferable to minimize the time during which the reflective layer is held at the re-crystallization temperature. For this reason, it is preferable to establish a rapid cooling system by adopting Ag or a Ag alloy—high thermal conductivity species—in the reflective layer. The thickness of the reflective layer is preferably large in view of the fact that in high-speed recording, the degree of modulation increases with increasing thickness of the reflective layer. However, the reflective layer is preferably 140 nm to 300 nm in thickness because if the reflective layer is too thick, film separation becomes likely to occur. Moreover, in order to minimize the occurrence of reproduction errors, it is preferable to increase the reflective layer thickness so that as much heat can be dissipated as possible.

When Ag or a Ag alloy is used for the reflective layer and a S-containing material is used for the second protective layer, it is preferable to provide a sulfuration prevention layer between the reflective layer and the second protective layer. This layer has a function of preventing the generation of $Ag_2S$ formed by reaction of S contained in the second protective layer with Ag contained in the reflective layer. Suitable materials of the sulfuration prevention layer include TiC, TiO, a mixture of TiC and TiO, SiC, Si, $SiO_2$, $Ta_2O_5$, and $Al_2O_3$.

A proper recording layer thickness range is 10 nm to 18 nm; a thickness less than 10 nm may result in low light-absorbing capability and lost of its function as a recording layer, whereas a thickness of greater than 18 nm may result in poor recording sensitivity.

The recording layer is preferably prepared by means of sputtering method. An example of the method of preparing a sputtering target is as follows: A certain amount of target compound is measured into a glass ampule, and heated and melted. Thereafter, the resultant material is pulverized using a pulverizer and the resultant powder is heated and sintered to produce a disc-shaped target.

Initial crystallization of the recording layer is preferably conducted by applying a laser beam of 15-40 mW/μm² power density onto a phase change optical recording medium rotating at a constant linear velocity of within 10-25 m/s. Initial repetitive recording characteristics is determined according to the initial crystallization conditions; it is preferable to conduct high-speed initial crystallization for materials with higher crystallization rates. Initial crystallization at a linear velocity of less than 10 m/s results in the formation of a large crystal particle which tends to deform the amorphous mark edge, thereby increasing jitter values. On the other hand, initial crystallization at a linear velocity of less than 25 m/s results in poor disc trackability and thus there is a tendency that a reflectivity value distribution forms. In addition, a power density of less than 15 mW/μm² results in failure to obtain uniform crystals due to power shortage, and a power density of greater than 40 mW/μm² results in poor repetitive recording characteristics due to too high power.

EXAMPLE

Hereinafter, the present invention will be described in detail with reference to Examples, which however shall not be construed as limiting the invention thereto. Note in Table 2 that the average crystal particle diameter in Example 2 is a value for the second protective layer, and the average crystal particle diameter in the other Examples is a value for the first protective layer. Note also in Table 3 that the average crystal particle diameter is not shown because no crystallization occurs.

Preparation of Phase Change Optical Recording Media

Example 1

A phase change optical recording medium (disc) was manufactured in the manner described below.

Note that sputtering was conducted using a single-wafer sputtering device (by UNAXIS) under the following condition: atmosphere=Ar gas, power=1-5 kW, Ar gas pressure=2× $10^{-3}$ Torr. On a polycarbonate substrate that is 12 cm in diameter and 0.6 mm in thickness and has a groove of 27 nm depth and 0.74 μm track pitch, a first protective layer, a phase change recording layer, a second protective layer, and a reflective layer were sequentially deposited by means of sputtering method. The first protective layer was formed by sputtering of $In_2O_3$—$SnO_2$ (90:10 wt %) and deposited to a thickness of 70 nm. The phase change recording layer was formed by sputtering of $Sb_{71}Sn_{19}Ge_5Ga_5$ (atomic %) and deposited to a thickness of 14 nm. The second protective layer was formed by sputtering of ZnS—$SiO_2$ (80:20 mol %) and deposited to a thickness of 8 nm. The reflective layer was formed by sputtering of a Ag alloy (Ag—Pd(1 atomic %)-Cu(1 atomic %)) and deposited to a thickness of 200 nm. Moreover, a UV curable acrylic resin (SD318, produced by Dainippon Ink and Chemicals, Incorporated) was applied over the reflective layer using a spinner to a thickness of about 8 μm, and cured by irradiation with ultraviolet light to form an organic protective layer. Another polycarbonate resin substrate that is 12 cm in diameter and 0.6 mm in thickness was then bonded to the organic protective layer using an adhesive to produce a phase change optical recording medium. Table 1 lists layer compositions of this disc. The composition of each layer is nearly the same as its corresponding sputtering target.

Example 2

A phase change optical recording medium was produced as in Example 1 except that the first protective layer was formed using ZnS—$SiO_2$ (80:20 mol %) and deposited to a thickness of 60 nm, the recording layer was formed using $Sb_{75}In_{18}Zn_3Ge_4$ (atomic %) and the second protective layer was formed using $Nb_2O_5$ and deposited to a thickness of 15 nm. Table 1 lists layer compositions of this disc.

Example 3

A phase change optical recording medium was produced as in Example 1 except that the first protective layer was formed using ZnO and deposited to a thickness of 60 nm and the recording layer was formed using $Sb_{78}In_{18}Zn_4$ (atomic %). Table 1 lists layer compositions of this disc.

30 mW/μm² power density while moving the laser beam in the disc radial direction at 50 μm/r.

<Evaluation>

Figure 3:
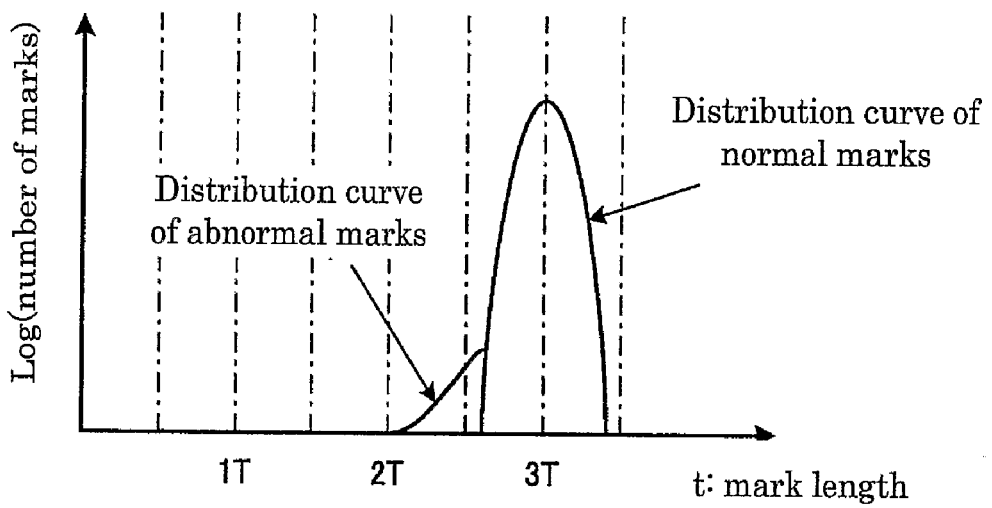
FIG. 3 shows the measurement results of the lengths of the binarized marks as measured by a time interval analyzer.

For the evaluation of recording/reproduction performance of the discs, an optical recording media evaluator (ODU1000, manufactured by PulseTec) was used that is equipped with a pickup head that includes a laser source of 660 nm wavelength and a lens with an aperture numeral (NA) of 0.65. The following evaluation was made to check the frequency of the occurrence of marks that have a crystal grown therein. A single pattern of alternating 3T marks and 3T spaces, wherein shorter marks most likely occur, was recorded onto the disc, and a mark length measurement after binarization was made using a time interval analyzer (TIA) manufactured by Yokogawa. As shown in FIG. 3, marks of shorter than 2.5T other than normal 3T marks are short marks that have a crystal grown therein. Herein, "3T window error" is defined as the ratio of the number of short marks to the number of normal marks.

Figure 4:
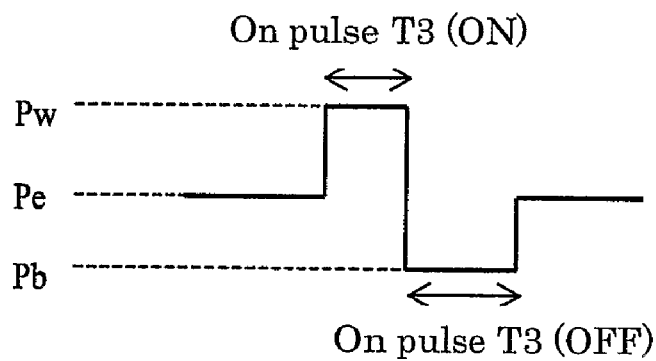
FIG. 4 shows a write strategy for measuring 3T window errors.

In the write strategy shown in FIG. 4, the 3T window error was measured with the on pulse-width fixed and with the off pulse-width varied. The largest value of the 3T window error was defined as the maximum 3T window error value. The recording linear velocity was set to 21 m/s, a value equivalent to 6×DVD speed and where errors most likely occur. The maximum 3T window error after 10 times overwriting on the same track was measured.

The crystallinity of the protective layer was determined by observation through a transmission electron microscope and by electron diffraction. Observation was made using JEM-2100F, a transmission electron microscope manufactured by JEOL Ltd., at an acceleration voltage of 200 kV. The protective layer was determined to be a crystalline film if as a result of electron diffraction either spots indicative of crystal or diffraction rings indicative of polycrystal were observed. If the protective layer was determined to be a crystalline film, the average crystal particle diameter was measured using the transmission electron microscope. The average crystal particle diameter was determined by averaging the diameters of 20 different crystal particles imaged at a magnification of 200,000×.

A random pattern subjected to EFM+ modulation was overridden for 10 times on the same track at a linear velocity of 42 m/s (12×DVD) and 21 m/s (6×DVD), and jitter (data-

TABLE 1

| | Layer constitution | | | |
| --- | --- | --- | --- | --- |
| Ex. | First protective layer | Recording layer | Second protective layer | Reflective layer |
| 1 | $In_2O_3$—$SnO_2$ (70 nm) | $Sb_{71}Sn_{19}Ga_5Ge_5$ (16 nm) | ZnS—$SiO_2$(8 nm) | Ag alloy(200 nm) |
| 2 | ZnS—$SiO_2$ (60 nm) | $Sb_{75}In_{18}Zn_3Ge_4$ (14 nm) | $NbO_2$(15 nm) | Ag alloy(201 nm) |
| 3 | ZnO (60 nm) | $Sb_{78}In_{18}Zn_4$ (14 nm) | ZnS—$SiO_2$(8 nm) | Ag alloy(202 nm) |

<Initial Crystallization>

Initial crystallization was conducted on each of the phase change optical recording media prepared in Examples 1 to 3 using an initializing device (POP120-7AH, manufactured by Hitachi Computer Peripherals Co., Ltd.) equipped with a laser head that produces a laser beam of 810 nm wavelength and a laser spot of about 1 μm width and 75 μm length and that features a laser focusing function. Initialization was conducted on the optical recording medium rotating at a constant linear velocity of 18 m/s by irradiating it with a laser beam of to-clock jitter, a value obtained by standardizing a with the detection window width (Tw)) and degree of modulation were measured. The write strategy was optimized and all reproduction operations were conducted at a linear velocity of 3.5 m/s and power of 0.7 mW. Archivability was determined by placing the written disc into a constant-temperature bath of 80° C. and 85% RH and measuring jitter every 100 hours. The time at which the jitter value showed 5% increase was considered limit archivability time, i.e., the time from which archivability cannot be maintained. Table 2 shows evaluation results for the discs prepared in Examples 1 to 3.

TABLE 2

| Ex. | 12x DOW10 jitter (%) | 12x degree of modulation (%) | Maximum 6x 3T window error | 6x DOW10 jitter (%) | Limit archivability time at 80° (h) | Average crystal particle diameter (nm) |
|---|---|---|---|---|---|---|
| 1 | 9.8 | 55 | 4.E−03 | 8.4 | 100 | 22 |
| 2 | 9.9 | 51 | 6.E−03 | 8.6 | 100 | 29 |
| 3 | 9.8 | 50 | 3.E−03 | 8.5 | Marks disappeared | 31 |

Comparative Example 1

A phase change optical recording medium was produced as in Example 1 except that the first protective layer was changed to a double layer consisting of a ZnS—SiO$_2$ (80:20 mol %) layer of 56 nm thickness and a SiO$_2$ film of 4 nm thickness, the recording layer was changed to Sb$_{75}$In$_{18}$Zn$_3$Ge$_4$ (atomic %), and the thickness of the second protective layer was changed to 12 nm, and similar evaluations were made. Note that the first protective layer was produced by sequential sputtering of the sputtering targets for the ZnS—SiO$_2$ and SiO$_2$ layers. Table 3 lists layer compositions of this disc, and Table 4 shows evaluation results. Electron diffraction analysis of the ZnS—SiO$_2$ and SiO$_2$ constituting the first protective layer revealed the presence of hollow patterns, which are indicative of the presence of amorphous structure.

TABLE 3

| | Layer constitution | | | |
|---|---|---|---|---|
| Compara. Ex. | First protective layer | Recording layer | Second protective layer | Reflective layer |
| 1 | ZnS—SiO$_2$ (56 nm)/SiO$_2$ (4 nm) | Sb$_{75}$In$_{18}$Zn$_3$Ge$_4$ (14 nm) | ZnS—SiO$_2$ (12 nm) | Ag alloy (200 nm) |

TABLE 4

| Compara. Ex. | 12x DOW 10 jitter (%) | 12x degree of modulation (%) | Maximum 6x 3T window error | 6x DOW10 jitter (%) | Limit archivability time at 80° (h) |
|---|---|---|---|---|---|
| 1 | 14.7% | 45 | 1.E−01 | 8.9 | 400 |

As can be seen from Table 2, the discs prepared in Examples 1 to 3 showed such relatively excellent high-speed recording characteristics that 12×DOW10 jitter values were not greater than 10%. The disc prepared in Comparative Example 1, by contrast, showed a 12×DVD DOW10 jitter of as high as 14.7% and degree of modulation of as low as 45%, resulting in poor high-speed recording characteristics.

Electron diffraction patterns obtained in Examples 1 to 3 were investigated using the transmission electron microscope. The first protective layer prepared in Example 1, which is made of In$_2$O$_3$—SnO$_2$, showed diffraction rings that indicate that the first protective layer is a crystalline film. Moreover, a dark field image was observed using the transmission electron microscope, and the average crystal particle diameter determined by averaging the diameters of crystal particles randomly selected from those within a 1 μm square of the image was 22 nm. The second protective layer prepared in Example 2, which is made of Nb$_2$O$_5$, also showed diffraction rings and had an average crystal particle diameter of 29 nm, and the first protective layer prepared in Example 3, which is made of ZnO, also showed diffraction rings and had an average crystal particle diameter of 31 nm. The ZnS—SiO$_2$ films other than the foregoing showed hollow patterns, which are indicative of the presence of amorphous structure.

The discs were then subjected to a 80° C. archivability test. The disc of Example 1 showed a jitter increase of not less than 5% after exposure to 80° C. for 200 hours, and the disc of Example 2 showed a jitter increase of over 5% after exposure to 80° C. for 100 hours. With respect to the disc of Example 3, almost all amorphous marks disappeared after exposure to 80° C. for 100 hours. The average crystal particle diameter in Example 3, as measured using the transmission electron microscope, was 31 nm and smaller than those in Examples 1 and 2, and thus the disc showed poor archivability. This may be due to the fact that the protective layer had large crystal particles. Compared to Example 3, Examples 1 and 2 showed small crystal particle diameters and archivability improved to a small extent.

While both the first and second protective layers prepared in Comparative Example 1 were amorphous and the maximum 6×3T window error value was 1.0E-1, the 3T window errors in Examples 1 to 3 were all reduced to from 3.0E-3 to 6.0E-3. The disc of Comparative Example 1 showed relatively excellent archivability, but showed poor 12× recording characteristics and high 6×3T window error. This means that the disc of Comparative Example 1 is not suitable for high-speed recording which is equivalent to 12×DVD or faster.

Examples 4 to 12

Phase change optical recording media of Examples 4 and 6-12 were produced as in Example 2 except that the second protective layer was changed to those shown in Table 5 (ZnO-based transparent conductive films). Moreover, a phase change optical recording medium of Example 5 was produced as in Example 2 except that the second protective layer was change to that shown in Table 1 (a ZnO-based transparent conductive film) and the first protective layer was changed to a double layer consisting of a ZnS—SiO$_2$ (80:20 mol %) layer of 50 nm thickness and a ZnO:Al (lwt %) film of 10 nm thickness. The first protective layer was produced by sequential sputtering of the sputtering targets for the ZnS—SiO$_2$ and a ZnO:Al layers. Table 5 lists layer compositions of this disc, and Table 6 shows evaluation results. The electric resistance values and average transmittance values of the second protective layers of Examples 4 to 12 were measured in the manner described below.

<Electric Resistance>

Films having the same composition as the second protective layers of Examples 4 to 12 shown in Table 5 were deposited onto glass substrates to a thickness of 15 nm. These films were considered the second protective layers of Examples 4 to 12 and were subjected to electric resistance measurements by means of a 4-proble resistance meter (Loresta-AP by Mitsubishi Chemical Corporation). The measurement results are as follows: $5\times10^{-3}$ Ωcm (Example 4); $5\times10^{-3}$ Ωcm (Example 5); $6\times10^{-3}$ Ωcm (Example 6); $5\times10^{-3}$ Ωcm (Example 7); $2\times10^{-2}$ Ωcm (Example 8); $4\times10^{-2}$ Ωcm (Example 9); $7\times10^{-2}$ Ωcm (Example 10); $3\times10^{-2}$ Ωcm (Example 11); and $8\times10^{-2}$ Ωcm (Example 12).

<Average Transmittance>

As in the case of electric resistance measurements described above, films having the same composition as the second protective layers of Examples 4 to 12 shown in Table 5 were deposited onto glass (quartz glass) substrates to a thickness of 15 nm. These films were considered the second protective layers of Examples 4 to 12 and were subjected to average transmittance measurements by means of a ultraviolet and visible spectrophotometer (UV-2500 by Shimadzu Corporation). The average transmittance measurements were conducted over a wavelength range of 600-700 nm at room temperature. The measurement results are as follows: 94% (Example 4); 94% (Example 5); 93% (Example 6); 93% (Example 7); 91% (Example 8); 89% (Example 9); 89% (Example 10); 90% (Example 11); and 87% (Example 12).

TABLE 5

Layer constitution

| Ex. | First protective layer | Recording layer | Second protective layer | Reflective layer |
|---|---|---|---|---|
| 4 | ZnS—SiO$_2$ (60 nm) | Sb$_{75}$In$_{18}$Zn$_3$Ge$_4$ (14 nm) | ZnO: Al (1 wt %) (15 nm) | Ag alloy (200 nm) |
| 5 | ZnS—SiO$_2$ (50 nm)/ZnO: Al (1 wt %) | Sb$_{75}$In$_{18}$Zn$_3$Ge$_4$ (14 nm) | ZnO: Al (1 wt %) (15 nm) | Ag alloy (200 nm) |
| 6 | ZnS—SiO$_2$ (60 nm) | Sb$_{75}$In$_{18}$Zn$_3$Ge$_4$ (14 nm) | ZnO: Ga (1 wt %) (15 nm) | Ag alloy (200 nm) |
| 7 | ZnS—SiO$_2$ (60 nm) | Sb$_{75}$In$_{18}$Zn$_3$Ge$_4$ (14 nm) | ZnO: Mn (1 wt %) (15 nm) | Ag alloy (200 nm) |
| 8 | ZnS—SiO$_2$ (60 nm) | Sb$_{75}$In$_{18}$Zn$_3$Ge$_4$ (14 nm) | ZnO: Ge (2 wt %) (15 nm) | Ag alloy (200 nm) |
| 9 | ZnS—SiO$_2$ (60 nm) | Sb$_{75}$In$_{18}$Zn$_3$Ge$_4$ (14 nm) | ZnO: Cu (2 wt %) (15 nm) | Ag alloy (200 nm) |
| 10 | ZnS—SiO$_2$ (60 nm) | Sb$_{75}$In$_{18}$Zn$_3$Ge$_4$ (14 nm) | ZnO: Si (2 wt %) (15 nm) | Ag alloy (200 nm) |
| 11 | ZnS—SiO$_2$ (60 nm) | Sb$_{75}$In$_{18}$Zn$_3$Ge$_4$ (14 nm) | ZnO: In (5 wt %) (15 nm) | Ag alloy (200 nm) |
| 12 | ZnS—SiO$_2$ (60 nm) | Sb$_{75}$In$_{18}$Zn$_3$Ge$_4$ (14 nm) | ZnO: Mn (10 wt %) (15 nm) | Ag alloy (200 nm) |
| 13 | ZnS—SiO$_2$ (60 nm) | Sb$_{75}$In$_{18}$Zn$_3$Ge$_4$ (14 nm) | ZnO: Bi (10 wt %) (15 nm) | Ag alloy (200 nm) |
| 14 | ZnS—SiO$_2$ (60 nm) | Ag$_8$In$_8$Sb$_{75}$Te$_9$ (14 nm) | ZnO: Mn (5 wt %) (15 nm) | Ag alloy (200 nm) |
| 15 | ZnS—SiO$_2$ (60 nm) | Ge$_{15}$Sb$_{65}$Sn$_{20}$ (14 nm) | ZnO: Mn (5 wt %) (15 nm) | Ag alloy (200 nm) |
| 16 | ZnS—SiO$_2$ (60 nm) | In$_{18}$Sb$_{72}$Te$_{10}$ (14 nm) | ZnO: Mn (5 wt %) (15 nm) | Ag alloy (200 nm) |
| 17 | ZnS—SiO$_2$ (60 nm) | In$_{15}$Sb$_{80}$Ge$_5$ (14 nm) | ZnO: Mn (5 wt %) (15 nm) | Ag alloy (200 nm) |
| 18 | ZnS—SiO$_2$ (60 nm) | In$_{16}$Sb$_{76}$Zn$_8$ (14 nm) | ZnO: Mn (5 wt %) (15 nm) | Ag alloy (200 nm) |
| 19 | ZnS—SiO$_2$ (60 nm) | Sb$_{71}$Sn$_{19}$Ga$_5$Ge$_5$ (14 nm) | ZnO: Mn (5 wt %) (15 nm) | Ag alloy (200 nm) |
| 20 | ZnS—SiO$_2$ (60 nm) | Ag$_3$In$_{11}$Ge$_2$Sb$_{76}$Te$_8$ (14 nm) | ZnO: Mn (5 wt %) (15 nm) | Ag alloy (200 nm) |

TABLE 6

| Ex. | 12x DOW10 jitter (%) | 12x degree of modulation (%) | Maximum 6x 3T window error | 6x DOW10 jitter (%) | Limit archivability time at 80° (h) | Average crystal particle diameter (nm) |
|---|---|---|---|---|---|---|
| 4 | 8.8 | 65 | 2.E−02 | 8.9 | 300 | 11 |
| 5 | 8.9 | 61 | 2.E−04 | 8.6 | 300 | 20 |
| 6 | 8.6 | 60 | 2.E−02 | 8.8 | 300 | 12 |
| 7 | 8.9 | 68 | 1.E−04 | 8.4 | over 600 | 9 |
| 8 | 9.2 | 62 | 2.E−04 | 8.5 | over 600 | 9 |
| 9 | 9.6 | 60 | 8.E−04 | 8.4 | 500 | 10 |
| 10 | 9.4 | 61 | 7.E−04 | 8.6 | 500 | 10 |
| 11 | 8.8 | 61 | 3.E−04 | 8.9 | 300 | 30 |
| 12 | 8.5 | 63 | 1.E−04 | 8.3 | over 800 | 2 |
| 13 | 9.6 | 53 | 8.E−04 | 8.5 | 300 | 25 |
| 14 | 9.1 | 60 | 1.E−04 | 8.4 | 300 | 7 |
| 15 | 9.1 | 61 | 8.E−04 | 8.6 | 500 | 7 |
| 16 | 8.9 | 62 | 5.E−04 | 8.5 | 300 | 7 |
| 17 | 9.0 | 60 | 4.E−04 | 8.3 | 300 | 7 |
| 18 | 8.8 | 62 | 5.E−04 | 8.5 | 300 | 7 |
| 19 | 8.9 | 61 | 5.E−04 | 8.4 | 500 | 7 |
| 20 | 9.2 | 61 | 2.E−04 | 8.3 | 300 | 7 |

As can be seen from Table 6, in Examples 4 to 12, 12×DOW jitter values are not greater than 10%, 6×3T window error values are not greater than 2.0E-02, generation of short marks is prevented, and degree of modulation is as high as 60% or more. Comparing Examples 4 to 12 with Examples 1 to 3, while only 6×DOW10 jitter values are similar, Examples 4 to 12 are excellent in the other parameters compared to Examples 1 to 3. The limit archivability time is significantly long (over 600 hours) particularly in Examples 7 and 8, which may be attributed to the small average crystal particle diameter of 9 nm. The average crystal particle diameters in Examples 4 to 12 are all not greater than 20 nm, and are not greater than 12 nm except in Example 5. It should be noted that it is difficult to stably produce a protective layer with an average crystal particle diameter of less than 2 nm, and the effect brought about by doing so still remains elusive. From the results shown above and in view of archivability, a preferable average crystal particle diameter ranges from 2 nm to 30 nm.

Example 13

In Example 13 ZnO:Bi was used for the second protective layer. This protective layer offered low jitter (not greater than 10%), but offered a smaller degree of modulation than those of the other Examples. The electric resistance and average transmittance values of the second protective layer were measured as in Example 4. The electric resistance was $1\times10^1$ Ωcm and average transmittance was 65%.

Examples 14 to 20

In Examples 14 to 20 ZnO:Mn was used for the second protective layer and similar evaluations were made, with only recording layer material compositions changed. The second protective layers formed of ZnO:Mn, even with different recording layer material compositions, offered low 12×DOW10 jitter values of not greater than 10% and high degree of modulation of not less than 60%. In addition, the 6×3T window error was reduced to not greater than 1.0E-3, and the limit archivability time was significantly long (over 300 hours). The electric resistance and average transmittance values of the second protective layer of Example 14 were measured as in Example 4. The electric resistance of the second protective layer was $6\times10^{-3}$ Ωcm and the average transmittance was 92%. Since the second protective layers of Examples 15 to 20 have the same composition as that of Example 14, their electric resistance and average transmittance values were considered the same as those of the second protective layer of Example 14.

Figure 5:
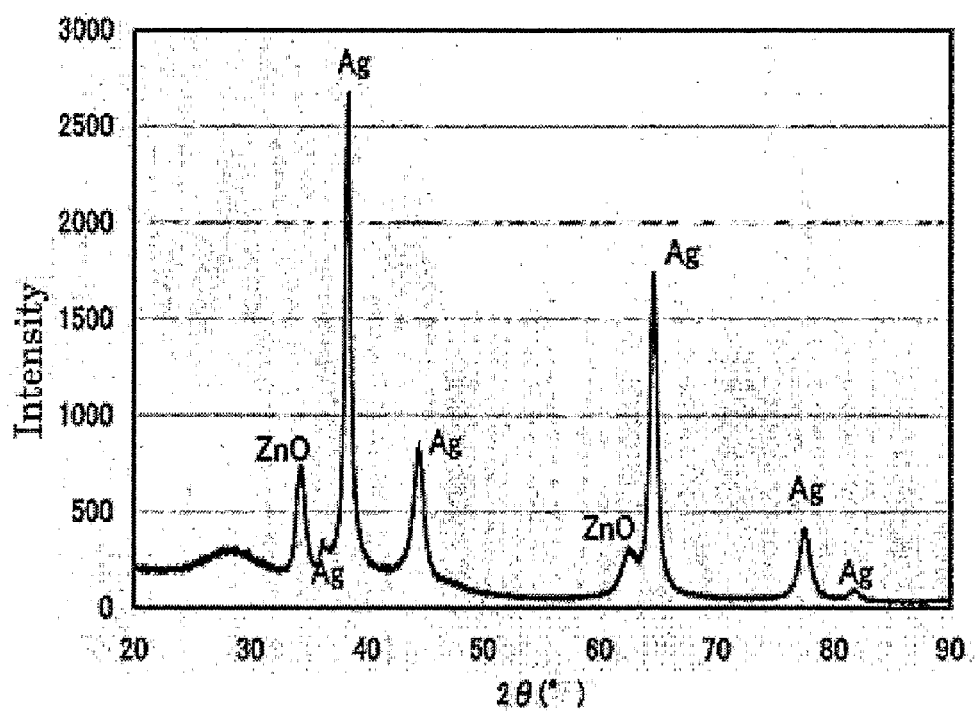
FIG. 5 shows an X-ray diffraction spectrum.

In Examples 4, 6, 7, and 8, X-ray diffraction spectra were measured. For X-ray diffraction, θ-2θ method was used (where θ is incident angle) adopting the CuKα ray (λ=1.54 angstrom). FIG. 5 shows a diffraction spectrum, where a diffraction peak of Ag in the reflective layer and a diffraction peak of ZnO were observed. The peak near 2θ=34° is a diffraction peak corresponding to the (002) plane of the ZnO crystal. The half-value width of the peak near 2θ=34° was measured, and the size of crystallite was calculated using the following Scherrer formula. The measurement results are shown in Table 7. The crystallite size determined using the half-value width of the X-ray diffraction peak and the average crystal particle diameter determined by observing the crystals using the transmission electron microscope were almost the same.

Scherrer Formula: $t=0.94\times\lambda/\beta \cos\theta$ where t is crystallite size, λ is wavelength of the incident X ray, β is half-value width, and θ is Bragg angle.

TABLE 7

| Examples | Half-value width (°) | Crystallite size (nm) |
|---|---|---|
| 4 | 0.79 | 10.9 |
| 6 | 0.73 | 11.8 |
| 7 | 0.89 | 9.8 |
| 8 | 0.86 | 10.1 |

The invention claimed is:

1. An optical recording medium comprising:
a first protective layer; a recording layer containing Sb as a main ingredient; a second protective layer; and a reflective layer, the first protective layer, the recording layer, the second protective layer and the reflective layer being provided in the order in which light passes through the medium for recording and reproduction of information,
wherein the first protective layer and/or the second protective layer, both of which are in contact with the recording layer, are/is formed of a crystalline oxide, and
wherein the second protective layer is electrically conductive and is configured to temporarily prevent heat generated at the recording layer from diffusing.

2. The optical recording medium according to claim 1, wherein at least one of the first protective layer and the second protective layer that are in contact with the recording layer has an average crystal particle diameter of 2 nm to 30 nm.

3. The optical recording medium according to claim 2, wherein at least one of the first protective layer and the second protective layer that are in contact with the recording layer has an average crystal particle diameter of 2 nm to 20 nm.

4. The optical recording medium according to claim 1, wherein the second protective layer is a crystalline transparent conductive film.

5. The optical recording medium according to claim 1, wherein the second protective layer contains zinc oxide as a main ingredient.

6. The optical recording medium according to claim 5, wherein the second protective layer contains one or more elements selected from the group consisting of Al, Ga, In, Mn, Ge, Cu, and Si.

7. The optical recording medium according to claim 1, wherein the second protective layer contains said one or more elements selected from the group consisting of Al, Ga, In, Mn, Ge, Cu, and Si in an amount of 0.1% by mass to 15% by mass.

8. The optical recording medium according to claim 1, wherein the recording layer containing Sb as the main ingredient further contains at least one of Te and Sn in an amount of 10 atomic % or less.

9. The optical recording medium according to claim 1, wherein the second protective layer releases the heat generated at the recording layer toward the reflective layer, after the second protective layer temporarily prevents the heat generated at the recording layer from diffusing.

10. The optical recording medium according to claim 1, wherein a temperature corresponding to the recording layer is increased, after the second protective layer temporarily prevents the heat generated at the recording layer from diffusing.

11. The optical recording medium according to claim 1, wherein the second protective layer contains $In_2O_3$ and $SnO_2$.

12. The optical recording medium according to claim 1, wherein the second protective layer contains $In_2O_3$ and ZnO.

13. The optical recording medium according to claim 1, wherein the second protective layer has an electrical resistance of $1\times10^{-1}$ Ωcm or less.

14. The optical recording medium according to claim 1, wherein the second protective layer has an electrical resistance of $1\times10^{-4}$ Ωcm to $1\times10^{-2}$ Ωcm.

* * * * *